(12) United States Patent
Walstrum, Jr. et al.

(10) Patent No.: US 7,853,811 B1
(45) Date of Patent: Dec. 14, 2010

(54) SUSPEND MODE OPERATION FOR REDUCED POWER

(75) Inventors: James A. Walstrum, Jr., San Jose, CA (US); Mark A. Moran, Milpitas, CA (US); Jinsong Oliver Huang, San Jose, CA (US); Patrick J. Crotty, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1168 days.

(21) Appl. No.: 11/498,467

(22) Filed: Aug. 3, 2006

(51) Int. Cl.
G06F 1/26 (2006.01)
G06F 1/32 (2006.01)

(52) U.S. Cl. .................................................. 713/320
(58) Field of Classification Search ................. 713/300
See application file for complete search history.

(56) References Cited

U.S. PATENT DOCUMENTS

| | | | |
|---|---|---|---|
| 6,286,107 B1 * | 9/2001 | Tamaki et al. ............... 713/320 |
| 7,026,840 B1 * | 4/2006 | May et al. ..................... 326/38 |
| 7,295,036 B1 * | 11/2007 | Zaveri et al. ................. 326/38 |
| 7,376,037 B1 * | 5/2008 | Law et al. ................... 365/226 |
| 2005/0091629 A1 * | 4/2005 | Eisenstadt et al. ............ 716/13 |

OTHER PUBLICATIONS

Aural Chinnappan and Kathleen Murchek, QuickLogic® Application Note 88, Maximizing Energy Consumptionwith Very Low Power Mode in PolarPro FPGAs Rev. A, Mar. 2006, pp. 1-9.*

* cited by examiner

*Primary Examiner*—Thomas Lee
*Assistant Examiner*—Brandon Kinsey
(74) *Attorney, Agent, or Firm*—William L. Paradice, III; John J. King (57) ABSTRACT

An integrated circuit (300) includes a suspend circuit that includes a first input to receive a suspend signal, a first output to generate an awake signal, and outputs to provide control signals to various integrated circuit resources. During suspend mode, the suspend circuit suspends operation of the integrated circuit resources by driving its output pins to one of a plurality of predefined state selected by corresponding mode select signals and by locking its synchronous elements to known states. Upon termination of suspend mode, the circuit re-activates the integrated circuit resources according to a user-defined timing schedule. The user-defined timing schedule and the mode select signals may be provided to the integrated circuit during its configuration as part of a configuration bitstream.

18 Claims, 7 Drawing Sheets

SUSPEND MODE OPERATION FOR REDUCED POWER

FIELD OF THE INVENTION

The present invention relates generally to reducing power consumption in semiconductor devices and more specifically to implementing a suspend mode in a programmable logic device.

BACKGROUND

A programmable logic device (PLD) is a general-purpose device that can be programmed by a user to implement a variety of selected functions. One type of PLD is the Field Programmable Gate Array (FPGA), which typically includes an array of configurable logic blocks (CLBs) surrounded by a plurality of input/output blocks (IOBs). The CLBs are individually programmable and can be configured to perform a variety of logic functions on a few input signals. The IOBs can be configured to drive output signals from the CLBs to external pins of the FPGA and/or to receive input signals from the external FPGA pins. The FPGA also includes a programmable interconnect structure that can be programmed to selectively route signals among the various CLBs and IOBs to produce more complex functions of many input signals. The CLBs, IOBs, and the programmable interconnect structure are programmed by loading configuration data into associated configuration memory cells that control various switches and multiplexers within the CLBs, IOBs, and the interconnect structure to implement logic and routing functions specified by the configuration data.

PLDs such as FPGA devices typically exhibit greater static power consumption than dedicated logic devices such as standard-cell application specific integrated circuits (ASICs). One reason for the PLD's higher power consumption is because while the PLD utilizes only a subset of its available resources for any given design, the unused resources nevertheless consume static power. As a result, PLDs have traditionally been deemed as unsuitable for low-power applications such as, for example, portable consumer electronic devices. However, continual declines in FPGA manufacturing costs has led to their deployment in high-volume portable consumer electronic devices such as PDAs, portable music players, cell phones, GPS devices, and the like. To conserve battery power, many of the components that form these portable devices are capable of entering a suspend mode that reduces static power consumption when the device or at least the component is not actively in use. It is also important for these components to quickly "wake-up" from suspend mode and return to a normal operation mode. As a result, configurable devices such as FPGAs should not be powered-down during suspend mode because all configuration data and logic states would be lost, thereby requiring a time consuming re-configuration operation.

Although there are many techniques to selectively and/or independently adjust the power provided to variously selected PLD components to reduce static power dissipation during standby mode without losing data stored in the PLD, none address the synchronization of an FPGA device to other devices in a system when the FPGA device is returning from suspend mode to active mode. For example, when an FPGA is powered-down and then re-booted in response to a system power-up, there are not any synchronization issues between the FPGA and other devices in the system because all devices are booting up and configuring themselves to pre-defined initial states. However, when the FPGA is placed in suspend mode and then returned to the active mode, the FPGA must be synchronized with the other devices in the system because one or more of the other devices may be in various states unknown to the FPGA. Further, it is also important to address the effect that an FPGA device in suspend mode may have upon the I/O buses connected between the FPGA device and other devices in the system.

SUMMARY

A method and apparatus are disclosed that allows a PLD to enter a suspend mode. In accordance with the present invention, a PLD disposed within a system includes a plurality of configurable resources, a suspend pin for receiving a suspend signal, an awake pin for outputting an awake signal from the PLD, and suspend logic coupled to the suspend pin, the awake pin, and the configurable resources. The configurable resources may include a number of configurable logic blocks (CLBs), block RAM, switch blocks, and/or a number of input/output blocks (IOBs).

When the suspend signal is asserted, the suspend logic acknowledges its receipt by de-asserting the awake signal and initiates the suspend mode in the PLD. The de-asserted awake signal may alert other system devices that the PLD is entering suspend mode. Once the PLD is in suspend mode, the suspend logic asserts a suspend input signal to de-activate the input circuits, asserts a suspend output signal to de-activate the output circuits, and asserts a suspend clock signal to suspend operation of the CLBs and the block RAM. For some embodiments, assertion of the suspend clock signal locks the CLBs and block RAM to known states, for example, by preventing the PLD system clock from triggering logic state changes therein. The suspend logic may also provide mode select signals to the output circuits, which in response thereto drive their associated I/O pins to one of a plurality of pre-defined states indicated by the corresponding mode select signal. Further, the suspend logic may implement any well-known technique to reduce static power consumption of the PLD during suspend mode.

When the suspend signal is de-asserted, the suspend logic acknowledges its receipt by asserting the awake signal and terminates the suspend mode in the PLD. The asserted awake signal may alert other system devices that the PLD is entering active mode and may be subsequently synchronized with the other system devices. Once suspend mode is terminated, the suspend logic de-asserts the suspend input signal to re-activate the input circuits, de-asserts the suspend output signal to re-activate the output circuits, and de-asserts the suspend clock signal to enable operation of the CLBs and the block RAM. For some embodiments, de-assertion of the suspend clock signal enables subsequent logic state changes in the CLBs and block RAM by allowing the system clock to clock data through the CLBs and block RAM. Because PLD resources such as the IOBs, CLBs, and block RAM are in known states when re-activated, the PLD resources may be easily synchronized with the other system devices after termination of suspend mode, thereby allowing the PLD to immediately resume interaction with the other system devices (e.g., without having to first transition the PLD resources to known states).

For some embodiments, the timing sequence according to which the PLD resources are re-activated upon termination of suspend mode may be embodied in a timing schedule defined by the user. The user-defined timing schedule may be included in a configuration bitstream that is provided to the PLD during well-known configuration operations. Further, for some embodiments, the mode select signals may also be included in the configuration bitstream. In this manner, the user may determine the states of the output pins during suspend mode, and may control the re-activation sequence of the PLD resources upon termination of suspend mode.

BRIEF DESCRIPTION OF THE DRAWINGS

Like reference numerals refer to corresponding parts throughout the drawing figures.

DETAILED DESCRIPTION

Embodiments of the present invention for implementing a suspend mode, corresponding to reduced power consumption, in an integrated circuit (IC) device are described below in the context of an exemplary FPGA architecture for simplicity only. It is to be understood that present embodiments are equally applicable for implementing suspend mode in other PLD architectures such as complex PLDs, and for implementing suspend mode in other types of integrated circuits including, for example, application-specific integrated circuit (ASIC) devices. In the following description, for purposes of explanation, specific nomenclature is set forth to provide a thorough understanding of the present invention. In other instances, well-known circuits and devices are shown in block diagram form to avoid obscuring the present invention unnecessarily. Further, the logic states of various signals described herein are exemplary and therefore may be reversed or otherwise modified as generally known in the art. Additionally, the interconnection between circuit elements or blocks may be shown as buses or as single signal lines. Each of the buses may alternatively be a single signal line, and each of the single signal lines may alternatively be a bus. Accordingly, the present invention is not to be construed as limited to specific examples described herein but rather includes within its scope all embodiments defined by the appended claims.

Figure 1:
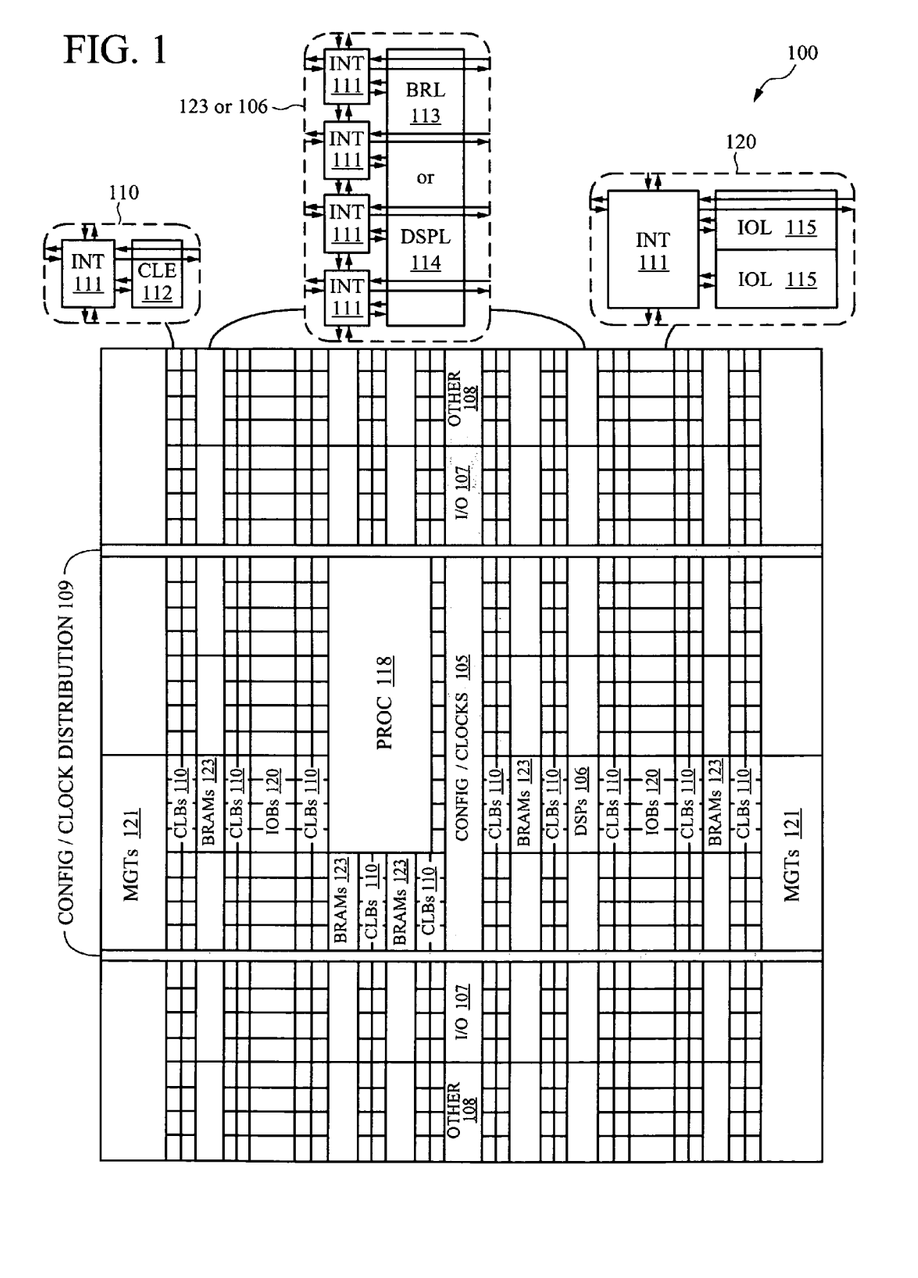
FIG. 1 is simplified block diagram of an FPGA architecture within which embodiments of the present invention may be implemented.

Advanced FPGAs can include several different types of programmable logic blocks in the array. For example, FIG. 1 illustrates an FPGA architecture 100 that includes a large number of different programmable tiles including multi-gigabit transceivers (MGTs 121), configurable logic blocks (CLBs 110), random access memory blocks (BRAMs 123), input/output blocks (IOBs 120), configuration and clocking logic (CONFIG/CLOCKS 105), digital signal processing blocks (DSPs 106), specialized input/output blocks (I/O 120) (e.g., configuration ports and clock ports), and other programmable logic 108 such as digital clock managers, analog-to-digital converters, system monitoring logic, and so forth. Some FPGAs also include dedicated processor blocks (PROC 118).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 110 can include a configurable logic element (CLE 112) that can be programmed to implement user logic plus a single programmable interconnect element (INT 111). A BRAM 123 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 120 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 118 shown in FIG. 1 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
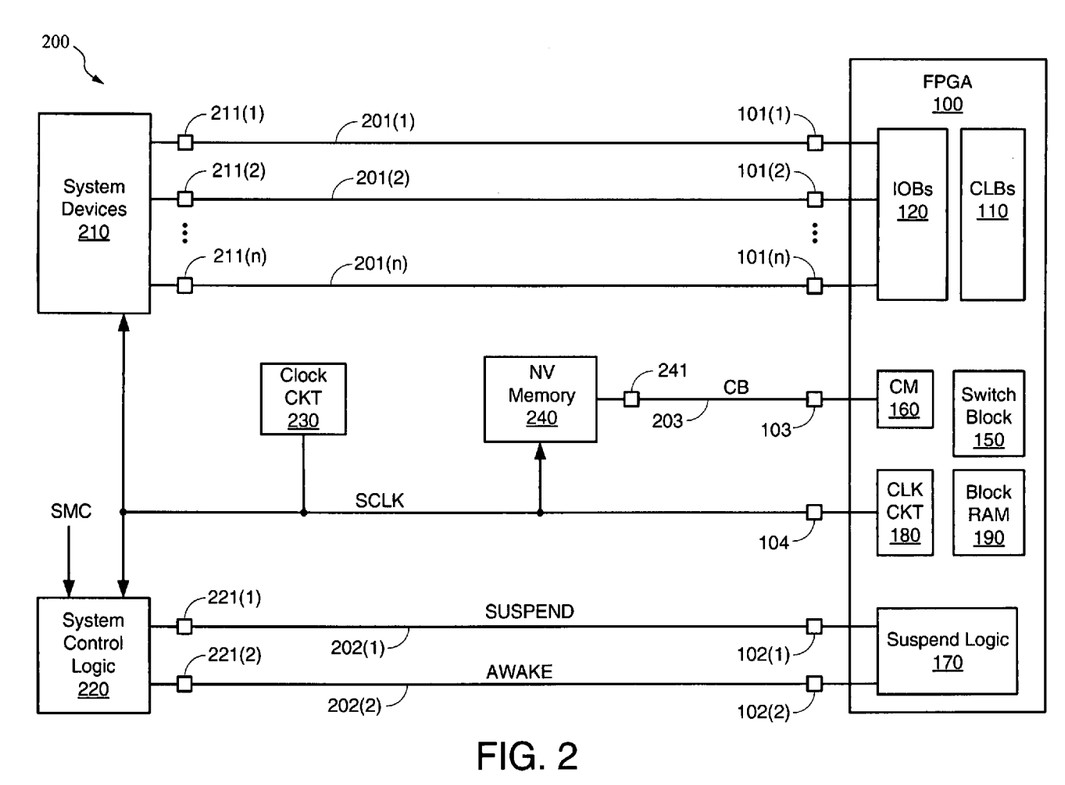
FIG. 2 is a block diagram illustrating an exemplary system that employs the FPGA of FIG. 1.

FIG. 2 shows an exemplary system 200 within which various embodiments of FPGA 100 of FIG. 1 may be employed. System 200 is shown to include FPGA 100, a number of system devices 210, system control logic 220, a clock circuit 230, and a non-volatile (NV) memory 240. Although not shown in FIG. 2 for simplicity, system devices 210, system control logic 220, clock circuit 230, NV memory 240, and FPGA 100 each include at least one power terminal coupled to receive a system voltage supply (VCC).

Clock circuit 230, which is well-known, provides a system clock signal (SCLK) to system devices 210, system control logic 220, NV memory 240, and to FPGA 100 via the FPGA's clock pin 104.

System devices 210, which collectively represent any number of various types of IC devices that may be employed within system 200 and that are capable of communicating with FPGA 100, include I/O pins 211(1)-211(n) that are coupled via corresponding signal lines 201(1)-201(n) to FPGA I/O pins 101(1)-101(n), respectively.

System control logic 220, which may be formed using well-known circuitry, includes an output pin 221(1) to provide a suspend signal (SUSPEND) to a suspend pin 102(1) of FPGA 100 via signal line 202(1), and includes an input pin 221(2) to receive an awake signal (AWAKE) from an awake pin 102(2) of FPGA 100 via signal line 202(2). During normal operation, system control logic 220 de-asserts SUSPEND to cause FPGA 100 to operate normally. When system control logic 220 asserts SUSPEND, FPGA 100 enters a suspend mode during which the FPGA's static power consumption may be reduced and/or the FPGA's resources may be locked to known states, as described in more detail below. For some embodiments, system control logic 220 may be configured to assert SUSPEND in response to one or more observed conditions such as, for example, when FPGA 100 is not being actively used by the system 200. Further, as shown in FIG. 2, system control logic 220 may also include an input to receive a system mode control signal (SMC) that may be used to control the assertion and de-assertion of SUSPEND. For such embodiments, SMC may be controlled by a user (e.g., system administrator) and/or by another system device (not shown for simplicity) within and/or coupled to system 200.

NV memory 240, which may be any suitable non-volatile memory device including, for example, a PROM, EPROM, EEPROM, Flash Memory, and/or masked ROM device, includes an I/O pin 241 coupled to the FPGA's configuration pin 103 via signal line 203. NV memory 240 stores configuration data for FPGA 100 that may be provided to FPGA 100 as a configuration bitstream (CB) during well-known configuration operations. Although depicted in FIG. 2 as being external to FPGA 100, for other embodiments, NV memory 240 may be formed on the same chip or within the same package as FPGA 100.

FPGA 100 is shown in FIG. 2 to include a plurality of CLBs 110, a plurality of IOBs 120, a plurality of switch blocks 150, a configuration memory (CM) 160, suspend logic 170, a clock circuit 180, and block RAM 190. For simplicity, the CLBs 110, IOBs 120, and switch blocks 150 are represented collectively in FIG. 2. Further, the interconnections between the various resources of FPGA 100 are not shown in FIG. 2 for simplicity. However, as known in the art, IOBs 120 are coupled to FPGA I/O pins 101(1)-101(n), and are selectively coupled to CLBs 110 via switch blocks 150. CLBs 110 are selectively interconnected to each other, to block RAM 190, and to other well-known elements such as embedded processors, DSP circuits, and the like (not shown in FIG. 2 for simplicity) via switch blocks 150.

CM 160, which may employ any suitable memory architecture and may include any suitable type of memory cells (e.g., SRAM cells, DRAM cells, registers, and the like), is coupled to the FPGA's configuration pin 103 and stores configuration data received from NV memory 240 during well-known configuration operations. As known in the art, the configuration data stored in CM 160 may include data to configure the FPGA's configurable resources (e.g., CLBs 110, IOBs 120, and switch blocks 150) to implement a specified user design. Further, in accordance with the present invention, the configuration data provided to and stored in CM 160 may also include suspend information for selectively de-activating the FPGA resources to one of a plurality of known or predefined states during suspend mode and for selectively re-activating the FPGA resources according to a user-programmable timing schedule upon termination of suspend mode.

Clock circuit 180, which is well-known, includes an input to receive SCLK from the FPGA's clock pin 104, and is configured to distribute SCLK to various FPGA resources such as CLBs 110, IOBs 120, switch blocks 150, CM 160, suspend logic 170, and block RAM 190.

Block RAM 190, which is well-known, may store various types of data for use by the FPGA's resources. For example, block RAM 190 may store soft data (e.g., firmware code, software updates, software patches, and the like) for a well-known embedded processor (not shown for simplicity) provided within the FPGA. Further, data stored in block RAM 190 may be used for other functions, for example, such as implementing a state machine.

Suspend logic 170 includes an input to receive SUSPEND from system control logic 220 via the FPGA suspend pin 102(1), and includes an output to generate AWAKE for output to system control logic 220 via the FPGA awake pin 102(2). For some embodiments, the suspend pin 102(1) and the awake pin 102(2) may be dedicated pins. For other embodiments, the suspend pin 102(1) and the awake pin 102(2) may be selected by configuration data provided to FPGA 100 during configuration of FPGA 100. In accordance with the present invention, suspend logic 170, which may be implemented using well-known circuit techniques, is configured to initiate and terminate the suspend mode of operation for FPGA 100 in response to SUSPEND, and for some embodiments, may be configured to implement one or more selectable features during suspend mode and/or upon termination of suspend mode.

More specifically, when system control logic 220 asserts SUSPEND (e.g., to logic high), suspend logic 170 de-asserts AWAKE (e.g., to logic low) to acknowledge receipt of the asserted SUSPEND signal to the other system devices (e.g., system devices 210 and system control logic 220), and initiates the suspend mode within FPGA 100. During suspend mode, suspend logic 170 may lock the FPGA's resources to known states, for example, so that the FPGA's resources may be subsequently unlocked in a known manner that allows for synchronization with the other system devices. For some embodiments, suspend logic 170 may be programmed (e.g., by the user) to drive various FPGA resources to selected, predefined states during suspend mode and/or to sequentially re-activate the resources according to a user-programmable timing schedule upon termination of suspend mode. Suspend logic 170 may also be used to implement various power reduction techniques to reduce static power consumption during suspend mode. In this manner, FPGA 100 may be placed in a low-power suspend mode and then quickly re-activated and synchronized with the system's other devices without having to be re-configured.

Figure 3A:
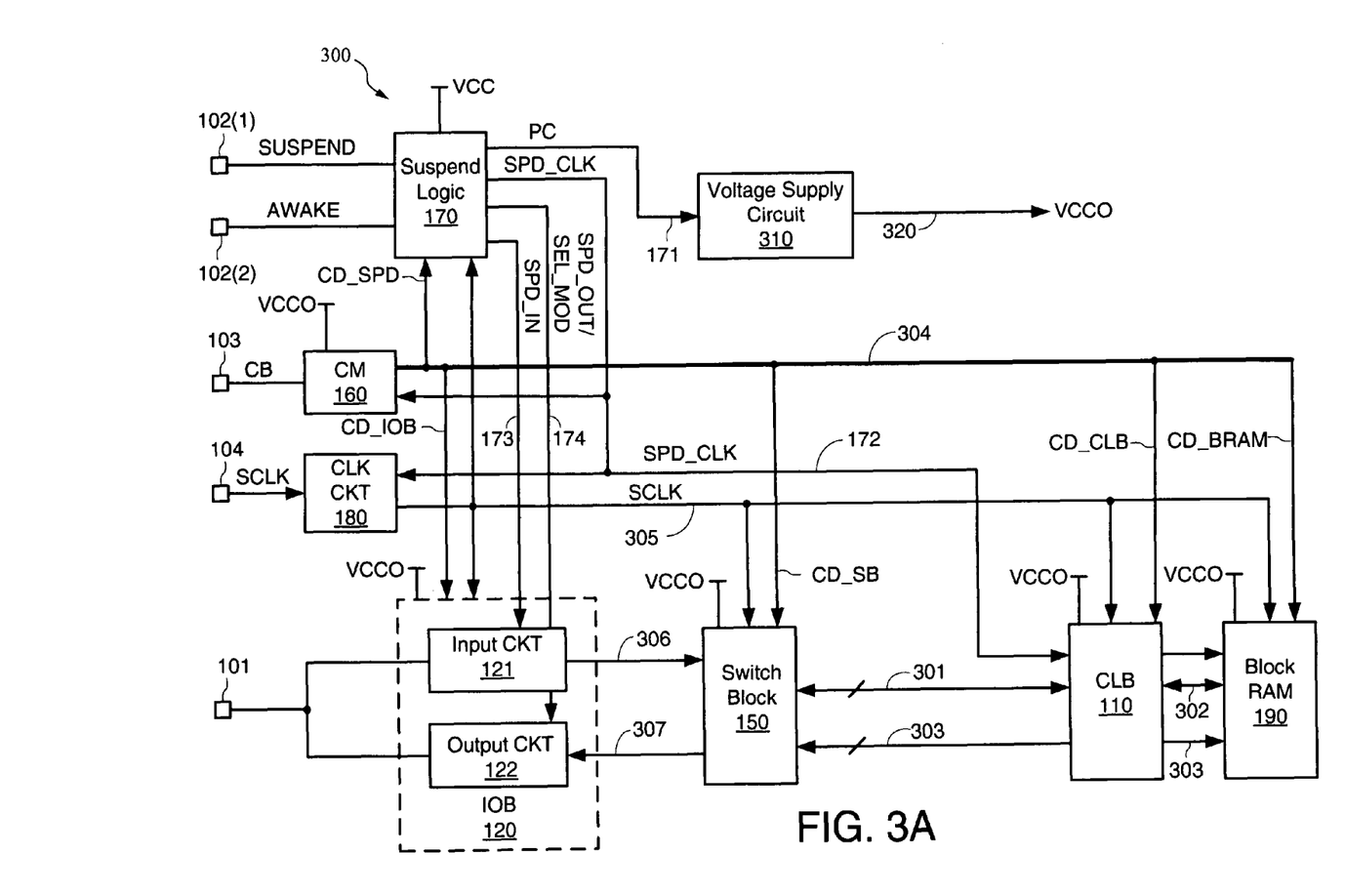
FIG. 3A is a simplified functional block diagram of one embodiment of the FPGA employed in the system of FIG. 2.

FIG. 3A shows a simplified functional diagram of an FPGA 300 that is one embodiment of FPGA 100 of FIGS. 1 and 2. FPGA 300 is shown to include a CLB 110, an IOB 120, switch block 150, CM 160, suspend logic 170, clock circuit 180, block RAM 190, and a voltage supply circuit 310. For simplicity, only one CLB 110, one IOB 120, and one switch block 150 are shown in FIG. 3A. However, it is to be understood that actual embodiments of FPGA 300 may include any numbers of CLBs 110, IOBs 120, and switch blocks 150.

Voltage supply circuit 310, which is well-known, includes a control terminal to receive a power control signal (PC) from suspend logic 170 via signal line 171, and includes an output to generate an operating voltage (VCCO) on a power rail 320. For the exemplary embodiment of FIG. 3A, voltage supply circuit 310 provides VCCO as the supply voltage to FPGA resources CLB 110, IOB 120, switch block 150, CM 160, and block RAM 190. For such embodiments, voltage supply circuit 310 may be configured to reduce the voltage level of VCCO in response to PC to reduce the static power consumption of the FPGA during suspend mode. For example, a de-asserted state of PC may cause voltage supply circuit 310 to drive VCCO to a normal operating voltage level, and an asserted state of PC may cause voltage supply circuit 310 to drive VCCO to a reduced operating voltage level. For some embodiments, the reduced level of VCCO is sufficient to maintain the logic states of data stored in CM 160 and block RAM 190 during suspend mode, thereby allowing the FPGA to return to normal mode without having to be re-configured with externally-provided configuration data.

For other embodiments, CLB 110, IOB 120, switch block 150, CM 160, and/or block RAM 190 may be powered by separate and/or different supply voltages. For example, for many FPGA devices commercially available from Xilinx, Inc., which is the assignee of the present invention, CLB 110 is powered by an internal supply voltage (VCCint), IOB 120 is powered by VCCO, and CM 160 and block RAM 190 are powered by a regulated voltage (Vgg) that is generated from an auxiliary supply voltage (VCCaux), where VCCO has a voltage between approximately 2.5-3.3 volts, VCCint has a voltage of between approximately 1.0-1.2 volts, VCCaux has a voltage of approximately 2.5 volts, and Vgg has a voltage between approximately 1.3-1.5 volts. For such embodiments, a power management unit (not shown for simplicity) responsive to one or more power control signals generated by suspend logic 170 may be employed to implement one or more user-selected power reduction techniques during suspend mode.

CM 160 includes any number of memory cells to store configuration data provided to FPGA 300 from external NV memory 240 as a configuration bitstream via configuration pin 103. The configuration data stored in CM 160 includes I/O configuration data (CD_IOB) for configuring IOB 120, CLB configuration data (CD_CLB) for configuring CLB 110, switch block configuration data (CD_SB) for configuring switch bock 150, suspend logic configuration data (CD_SPD) for configuring suspend logic 170, and BRAM data (CD_BRAM) for loading into Block RAM 190. For some embodiments, CM 160 also includes a control terminal for receiving a suspend clock signal (SPD_CLK) from suspend logic 170 via signal line 172, as shown in FIG. 3A.

IOB 120, which has a clock terminal to receive SCLK from clock circuit 180 and an input port to receive CD_IOB from CM 160 via bus 304, is shown in FIG. 3A as including a well-known input circuit 121 and a well-known output circuit 122. Input circuit 121, which has an input coupled to I/O pin 101, an output coupled to switch block 150 via signal lines 306, and a control terminal to receive a suspend input signal (SPD_IN) from suspend logic 170 via signal line 173, includes well-known input buffers (not shown for simplicity) that forward input signals received from I/O pin 101 to switch block 150. Output circuit 122, which has an input coupled to switch block 150 via signal lines 307, an output coupled to I/O pin 101, and a control terminal to receive a suspend output signal (SPD_OUT) and a suspend mode select signal (SEL_MOD) from suspend logic 170 via signal line 174, includes an output driver (not shown for simplicity) that can either drive output signals from switch block 150 to I/O pin 101 or tri-state I/O pin 101. Further, although not shown for simplicity, some embodiments of output circuit 122 may include a weak pull-up transistor, a weak pull-down transistor, and a weak keeper circuit that can place I/O pin 101 in various tri-stated modes, as known in the art.

CD_IOB determines whether IOB 120 is configured an input device or as an output device (or both). For example, when CD_IOB is in a first state, input circuit 121 is enabled and output circuit 122 is disabled so that IOB 120 operates as an input device that drives input signals received from input pin 101 to switch block 150. Conversely, when CD_IOB is in a second state, input circuit 121 is disabled and output circuit 122 is enabled so that IOB 120 operates as an output device that drives output signals from switch block 150 to output pin 101. SPD_IN is used to de-activate input circuit 121 during suspend mode, SPD_OUT is used to de-activate output circuit 122 during suspend mode, and SEL_MOD is used to select one of a plurality of predefined output states to which output circuit 122 may be driven during suspend mode.

CLB 110 includes I/O terminals coupled to switch block 150 via signal lines 301, I/O terminals coupled to block RAM 190 via signal lines 302, a clock input to receive SCLK from clock circuit 180 via signal line 305, an input port to receive CLB configuration data (CD_CLB) from CM 160 via bus 304, and a control terminal to receive a suspend clock signal (SPD_CLK) from suspend logic 170 via signal line 172. Although not shown in FIG. 3A for simplicity, CLB 110 may include numerous well-known circuit elements such as look-up tables (LUTs), multiplexers, flip-flops, registers, and the like that may be programmed using CD_CLB to implement various logic functions. As known in the art, SCLK (or a derivation thereof) may be used to clock data through various synchronous elements (e.g., LUTs, flip-flops, registers, and so on) of CLB 110.

Switch block 150 includes a control terminal to receive CD_SB from CM 160 via bus 304, a clock input to receive SCLK from clock circuit 180 via signal line 305, a plurality of first ports coupled to CLB 110 via signal lines 301, a plurality of second ports coupled to block RAM 190 via signal lines 303, a plurality of input ports selectively coupled to input circuit 121 via signal lines 306, and a plurality of output ports selectively coupled to output circuit 122 via signal lines 307. Switch block 150, which is well-known, may be configured in response to CD_SB to provide selective signal interconnections among CLB 110, IOB 120, block RAM 190, and other well-known FPGA resources (not shown for simplicity).

Block RAM 190 is shown in FIG. 3A as including a first read/write port coupled to CLB 110 via direct signal line connections 302, a second read/write port coupled to switch block 150 via signal lines 303, a write port to receive CD_BRAM from CM 160 via bus 304, a clock input to receive SCLK from clock circuit 180, and a control terminal to receive SPD_CLK from suspend logic 170.

Suspend logic 170 includes an input to receive SUSPEND from system control logic 220 via suspend pin 102(1), a clock input to receive SCLK from clock circuit 180, an input port to receive suspend mode configuration data (CD_SPD) from CM 160 via bus 304, a first output to provide AWAKE to system control logic 220 via awake pin 102(2), and second outputs to generate PC, SPD_IN, SPD_OUT, SEL_MOD, and SPD_CLK. For the exemplary embodiment shown in FIG. 3A, suspend logic 170 is powered by an operating voltage (VCC) that is separate from VCCO. In this manner, suspend logic 170 may remain operational when VCCO is reduced or disabled by voltage supply circuit 310 during suspend mode.

Further, for the exemplary embodiments shown in FIG. 3A, clock circuit 180 includes a control terminal to receive SPD_CLK from suspend logic 170. For some embodiments, clock circuit 180 may be configured to selectively lock SCLK to a known state in response to SPD_CLK. For other embodiments, SPD_CLK may not be provided to clock circuit 180.

In operation, upon assertion of SUSPEND by system control logic 220 (see also FIG. 2), suspend logic 170 de-asserts AWAKE to acknowledge receipt of the asserted suspend signal and initiates the suspend mode in the FPGA. More specifically, suspend logic 170 asserts SPD_IN and SPD_OUT to de-activate input circuit 121 and to de-activate output circuit 122, respectively, drives the I/O pin 101 of output circuit 122 to one of a plurality of predefined states selected by SEL_MOD, and asserts SPD_CLK to lock CLB 110, CM 160, and block RAM 190 in their present states. For some embodiments, SPD_CLK may be used as a clock disable signal that prevents SCLK from triggering logic state changes in CLB 110, CM 160, and/or block RAM 190. For other embodiments, SPD_CLK may be used to disable SCLK and freeze SCLK to a known state. Upon de-assertion of SUSPEND by system control logic 220, which triggers termination of suspend mode, suspend logic 170 asserts AWAKE to acknowledge receipt of the de-asserted suspend signal and terminates the suspend mode in the FPGA. More specifically, suspend logic 170 de-asserts SPD_IN to re-activate input circuit 121, de-asserts SPD_OUT to re-activate output circuit 122, and de-asserts SPD_CLK to unlock CLB 110, CM 160, and block RAM 190 to allow subsequent logic state changes therein. The timing sequence in which SPD_IN, SPD_OUT, and SPD_CLK are de-asserted upon termination of suspend mode may be user-programmable, as described below.

For many embodiments, the timing sequence for re-activating input circuit 121, output circuit 122, and the synchronous elements within CLB 110, CM 160, and block RAM 190 upon termination of suspend mode may be embodied in timing schedule data (TSD). For some embodiments, user-selected values for TSD and/or SEL_MOD may be provided to suspend logic 170 from CM 160 as part of CD_SPD and stored in a suitable memory element (not shown for simplicity) within and/or associated with suspend logic 170. Thus, for such embodiments, TSD and SEL_MOD may be included in the configuration bitstream provided from external NV memory 240 to the FPGA during well-known configuration operations.

Suspend logic 170 may be implemented using any suitable circuitry that asserts SPD_IN, SPD_OUT, and SPD_CLK to de-activate input circuit 121, to de-activate output circuit 122, and to lock CLB 110, CM 160, and block RAM 190 into known states, respectively, in response to an assertion of SUSPEND, and that sequentially de-asserts SPD_IN, SPD_OUT, and SPD_CLK to sequentially re-activate input circuit 121, re-activate output circuit 122, and unlock CLB 110, CM 160, and block RAM 190, respectively, according to the user-programmable timing schedule embodied by TSD upon termination of suspend mode. For some embodiments, suspend logic 170 may include a well-known state machine that controls the assertion of SPD_IN, SPD_OUT, and SPD_CLK and the selected state of SEL_MOD upon initiation of suspend mode and that controls the de-assertion sequence of SPD_IN, SPD_OUT, and SPD_CLK upon termination of the suspend mode in response to TSD.

Figure 3B:
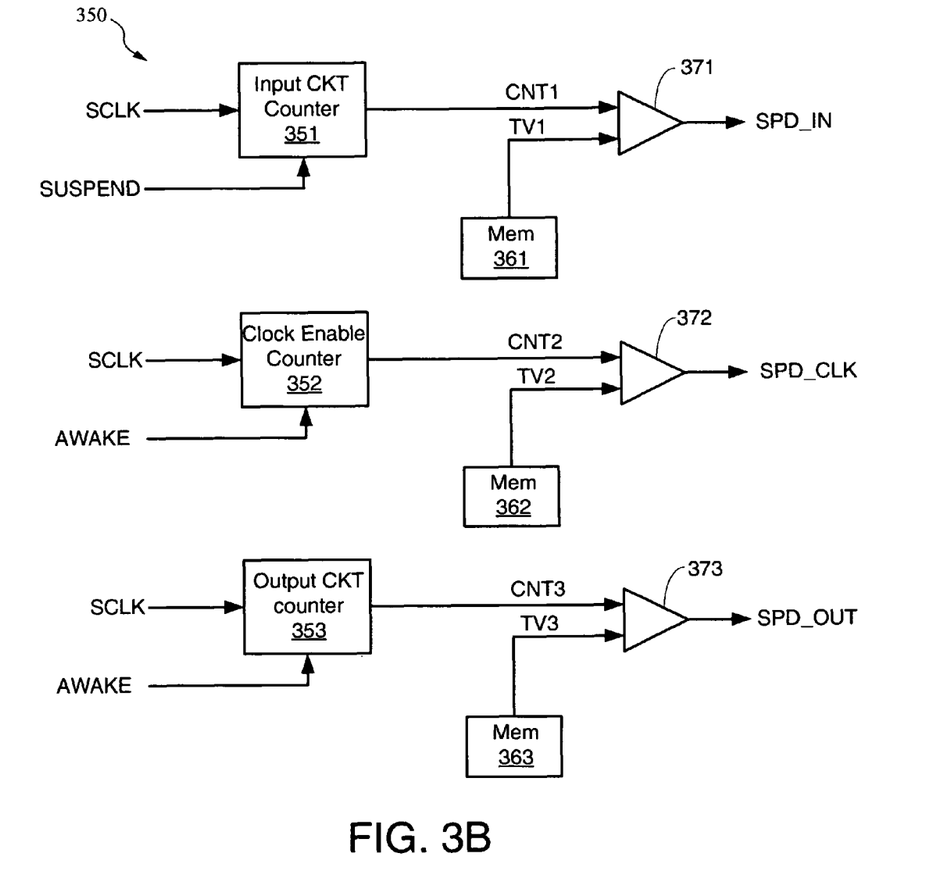
FIG. 3B is a simplified functional block diagram of one embodiment of the suspend logic of FIG. 3A.

For one embodiment, suspend logic 170 includes a one or more counters and associated programmable circuitry that together determine the re-activation sequence of input circuit 121, output circuit 122, and CLB 110/CM 160/block RAM 190 upon termination of suspend mode. For example, FIG. 3B shows a simplified functional block diagram of activation sequence logic 350 that may be employed in various embodiments of suspend logic 170. Sequence logic 350 includes counters 351-353, memory elements 361-363, and comparators 371-373. Memory elements 361-363, which may be any suitable storage devices, store trigger values TRV1-TRV3, respectively. For some embodiments, TRV1-TRV3 may form the timing schedule data (TSD), which in turn may be provided to suspend logic 170 from CM 160 as part of CD_SPD. Input circuit counter 351 includes an input to receive SCLK, an enable terminal to receive SUSPEND, and an output to provide a first count value (CNT1) to a first input of comparator 371, which includes a second input to receive TRV1 from memory element 361 and an output to generate SPD_IN. Clock enable circuit counter 352 includes an input to receive SCLK, an enable terminal to receive AWAKE, and an output to provide a second count value (CNT2) to a first input of comparator 372, which includes a second input to receive TRV2 from memory element 362 and an output to generate SPD_CLK. Output circuit counter 353 includes an input to receive SCLK, an enable terminal to receive AWAKE, and an output to provide a third count value (CNT3) to a first input of comparator 373, which includes a second input to receive TRV3 from memory element 363 and an output to generate SPD_OUT.

During suspend mode, the asserted state of SUSPEND initializes CNT1 to a zero value and prevents SCLK from incrementing CNT1, and the de-asserted state of AWAKE initializes CNT2 and CNT3 to zero values and prevents SCLK from incrementing CNT2 or CNT3. Thus, during suspend mode, input circuit counter 351 maintains CNT1 in a zero state, which causes comparator 371 to maintain SPD_IN in its asserted state. Similarly, clock enable counter 352 maintains CNT2 in a zero state, which causes comparator 372 to maintain SPD_CLK in its asserted state, and output circuit counter 353 maintains CNT3 in a zero state, which causes comparator 373 to maintain SPD_OUT in its asserted state.

Upon termination of suspend mode, the de-asserted state of SUSPEND enables input circuit counter 351 to increment CNT1 upon each subsequent triggering edge of SCLK. When CNT1 becomes equal to TRV1, comparator 371 de-asserts SPD_IN to re-activate input circuit 121. Similarly, upon termination of suspend mode, the asserted state of AWAKE enables clock enable counter 352 to increment CNT2 and enables output circuit counter 353 to increment CNT3 upon each subsequent triggering edge of SCLK. When CNT2 becomes equal to TRV2, comparator 372 de-asserts SPD_CLK to unlock CLB 110, CM 160, and block RAM 190, and when CNT3 becomes equal to TRV3, comparator 373 de-asserts SPD_OUT to re-activate output circuit 122. In this manner, the trigger values TRV1-TRV3 may be used to select the number of SCLK cycles after which SPD_IN, SPD_CLK, and SPD_OUT are de-asserted upon termination of suspend mode.

Figure 4:
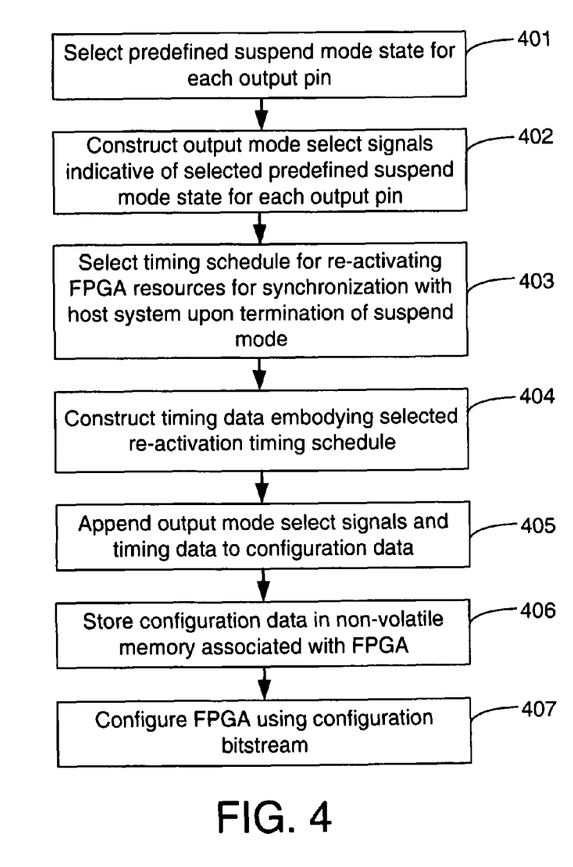
FIG. 4 is an illustrative flow chart depicting an exemplary configuration operation for the FPGA of FIG. 3A.

An exemplary operation for configuring FPGA 300 to implement a suspend mode having user-programmable features is described below with respect to the illustrative flow chart of FIG. 4. Referring also to FIGS. 1, 2, 3A, and 3B, for each IOB 120 that will be configured as an output driver, the user first selects one of a plurality of predefined output states to which the output circuit 122 of the IOB will drive the corresponding output pin 101 during suspend mode (step 401), and then constructs an output mode select signal (SEL_MOD) that identifies the selected predefined output state (step 402). More specifically, for exemplary embodiments described herein, SEL_MOD may select one of five predefined states to which a corresponding output circuit 122 drives its output pin 101 during suspend mode, as summarized below in Table 1. In this manner, the user is able to select the output states of the FPGA I/O pins 101 during suspend mode, for example, so that the user may control the effect that FPGA has on other system devices 210 when the FPGA is in suspend mode. For other embodiments, other numbers of predefined output states may be provided.

TABLE 1

| SEL_MOD | SUSPEND STATE NAME | SUSPEND STATE FUNCTION |
|---|---|---|
| 000 | DRIVE_LAST_VALUE | Output driven to the last stored value in the output latch prior to suspend mode. Output driver continues to drive associated signals with the communication standard selected during device configuration |
| 001 | 3STATE | Output is tri-stated, which provides the lowest possible current if the user manages the pin drivers. This is the default setting for some embodiments |
| 010 | 3STATE PULLUP | Output is tri-stated, and a weak pull-up (e.g., 5-10 kΩ) is employed. |
| 011 | 3STATE PULLDOWN | Output is tri-stated, and a weak pull-down (e.g., 5-10 kΩ) is employed. |
| 100 | 3STATE KEEPER | Output is tri-stated. A weak keeper circuit is employed. |

Then, the user selects a timing schedule according to which the FPGA's resources (e.g., IOB input circuits 121, IOB output circuits 122, CLB 110, and block RAM 190) will be re-activated upon termination of suspend mode for synchronization with system devices 210 (step 403). Next, the user constructs timing schedule data (TSD) that embodies the selected re-activation timing schedule (step 404). For example, for the exemplary embodiments of suspend logic depicted in FIG. 3B, TSD may include trigger values TRV1-TRV3 to be stored in memory elements 361-363, respectively.

Next, SEL_MOD and TSD, which together form the suspend logic configuration data (CD_SPD), are combined with CD_IOB, CD_SB, CD_CLB, and CD_BRAM to form a configuration data set that embodies a user design to be implemented by the various resources of the FPGA and that embodies user-selectable states and re-activation sequences associated with the implementation of suspend mode in the FPGA (step 405). The configuration data is then stored in non-volatile memory 240 using well-known techniques (step 406). Then, during a well-known configuration operation, the configuration data stored in non-volatile memory 240 is provided to the FPGA as a configuration bitstream (CB) via configuration pin 103 and stored in CM 160, thereby configuring the FPGA (step 407). Thus, as described above with respect to FIG. 3A, CD_CLB configures CLB 110 to implement one or more desired logic functions, CD_IOB configures IOB 120 as either an input device or an output device, CD_SB configures switch block 150 to implement selective interconnections between the various FPGA resources, and CD_BRAM loads data (e.g., such as software code, initial signal states for CLB 110, and so on) into block RAM 190. Further, in accordance with some embodiments of the present invention, CD_SPD configures suspend logic 170 to implement selected suspend mode output states and to implement a timing sequence for re-activating various FPGA resources upon termination of suspend mode.

Figure 5A:
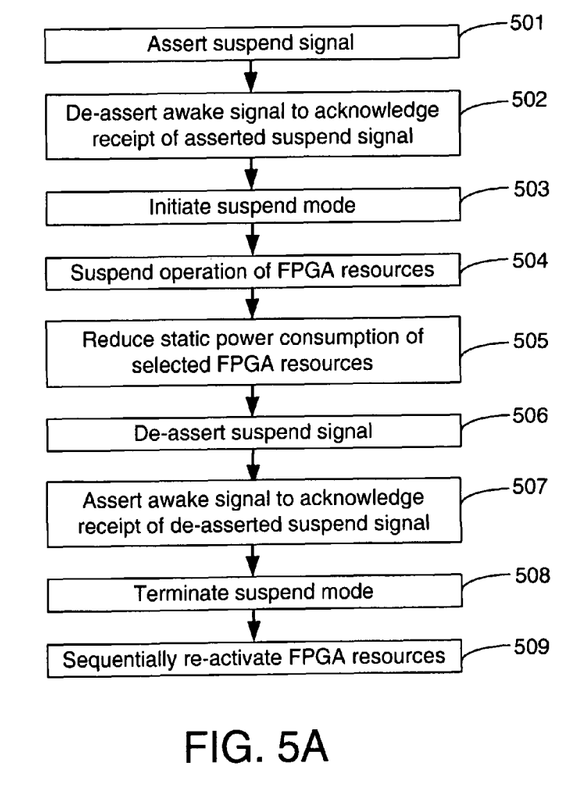
FIG. 5A is an illustrative flow chart depicting an exemplary operation for initiating and terminating a suspend mode for one embodiment of the FPGA of FIG. 3A.
Figure 5B:
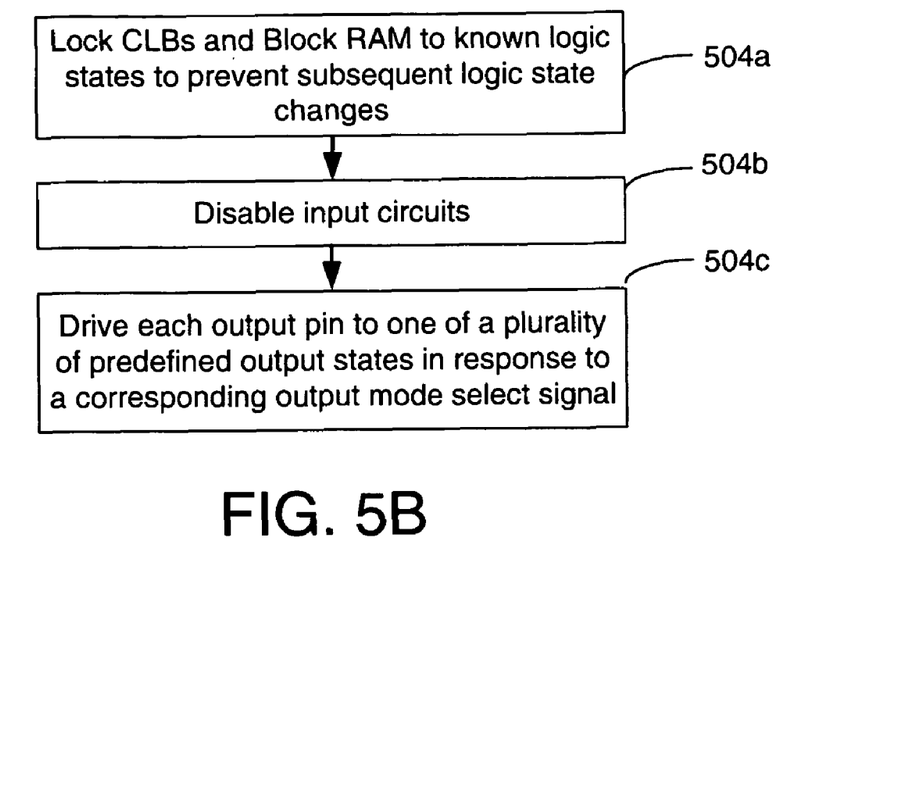
FIG. 5B is an illustrative flow chart depicting the implementation of various suspend mode features during the suspend mode depicted in FIG. 5A.
Figure 5C:
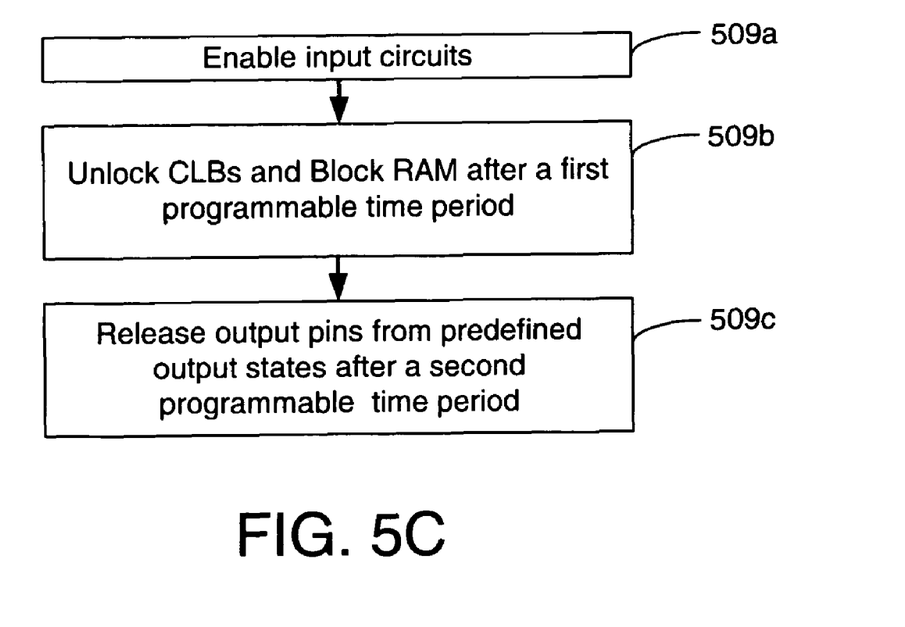
FIG. 5C is an illustrative flow chart depicting the re-activation of various FPGA resources upon termination of the suspend mode mentioned in FIG. 5A.
Figure 6:
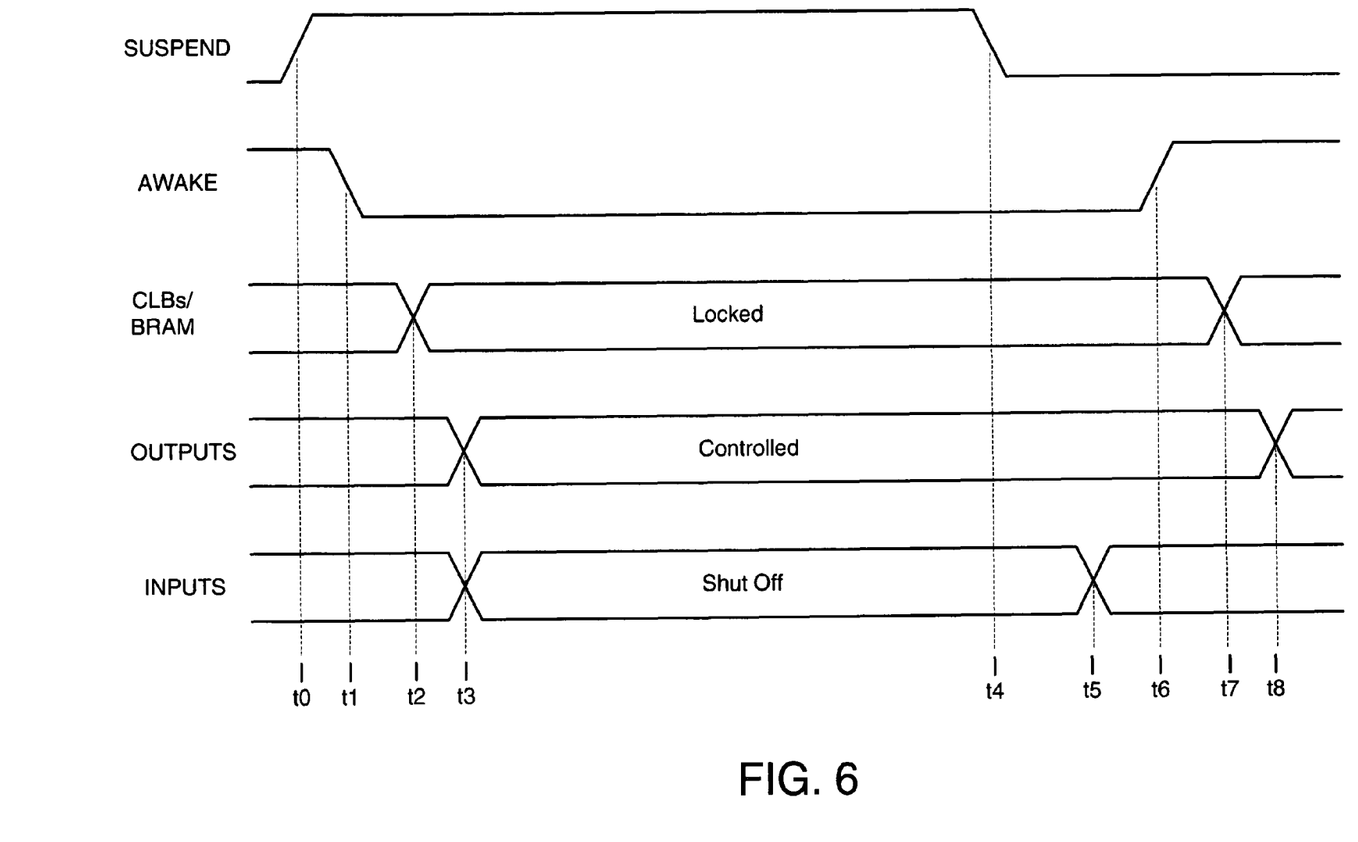
FIG. 6 is an illustrative timing diagram depicting an exemplary operation for preparing, initiating, and terminating the suspend mode depicted in the illustrative flow charts of FIGS. 4 and 5A-5C.

An exemplary operation for selectively implementing a suspend mode in FPGA 300 is described below with respect to the illustrative flow charts of FIGS. 5A-5C and the exemplary timing diagram of FIG. 6. Referring also to FIGS. 1, 2, 3A, and 3B, at time t0, system control logic 220 asserts SUSPEND (e.g., to logic high) on the FPGA's suspend pin 102(1) (step 501). System control logic 220 may assert SUSPEND in response to any suitable event, condition, and/or signal. For some embodiments, system control logic 220 asserts SUSPEND in response to an observable condition, for example, inactivity on the FPGA's I/O pins for a predetermined time period. For other embodiments, SUSPEND may be asserted in response to SMC. In response to the assertion of SUSPEND, suspend logic 170 de-asserts AWAKE (e.g., to logic low) on the FPGA's awake pin 102(2) at time t1, thereby acknowledging receipt of the asserted state of SUSPEND to system control logic 220 and/or to system devices 210 (step 502). The de-asserted state of AWAKE may be used to inform other system devices 210 that the FPGA is entering suspend mode, for example, so that the system devices 210 do not communicate with the FPGA.

For some embodiments, suspend logic 170 does not de-assert AWAKE unless SUSPEND has been asserted for more than a predetermined time period to prevent undesirable glitches in SUSPEND from inadvertently triggering the initiation of suspend mode in the FPGA. The predetermined time period may be selected in a well-known manner, for example, by counting a specified number of triggering edges of SCLK, although other techniques may be used. For some embodiments, the predetermined time period may be selected by the user and provided to suspend logic 170 as part of CD_SPD. For other embodiments, the predetermined time period may be fixed. For one embodiment, the predetermined time period is approximately 300 ns. Referring also to FIG. 3B, for some embodiments, assertion of SUSPEND resets the output (CNT1) of counter 351 to zero, and de-assertion of AWAKE resets the outputs (CNT2 and CNT3) of counters 352 and 353, respectively, to zero.

After de-assertion of AWAKE, suspend logic 170 initiates suspend mode in the FPGA (step 503). First, suspend logic 170 suspends operation of the FPGA's resources (step 504). More specifically, referring to the flow chart of FIG. 5B, suspend logic 170 first locks the FPGA's CLBs 110 and block RAM 190 (and other programmable resources) to known logic states at time t2 (step 504a). For example, suspend logic 170 may assert SPD_CLK to prevent logic state changes of signals and data latched or stored in CLBs 110 and block RAM 190 during suspend mode. More specifically, for some embodiments, assertion of SPD_CLK may be used to disable the clock enable inputs of various synchronous elements within CLBs 110 and/or to disable write signals provided to block RAM 190. For other embodiments, assertion of SPD_CLK may cause clock circuit 180 to disable the SCLK signal distributed to CLBs 110 and/or block RAM 190 to prevent logic state changes therein.

For some embodiments, suspend logic 170 asserts SPD_CLK to lock the CLBs 110 and block RAM 190 a predetermined time period (e.g., approximately 15 ns) after assertion of SUSPEND, although other time delays may be used. For other embodiments, the delay between assertion of SUSPEND and assertion of SPD_CLK may be selected by the user and provided to suspend logic 170 as part of CD_SPD.

Then, at time t3, suspend logic 170 disables the input circuits 121 of the IOBs (step 504b). For some embodiments, suspend logic 170 drives SPD_IN to an asserted state that causes input circuit 121 to disable its input buffers, for example, so that the FPGA is disabled from receiving input signals on its I/O pins 101. Also at time t3, suspend logic 170 instructs each of the output circuits 122 of the IOBs to drive their corresponding output pin 101 to a selected one of a plurality of predefined output states (step 504c). More specifically, suspend logic 170 asserts SPD_OUT to disable output circuit 122, and forwards SEL_MOD to output circuit 122. In response thereto, output circuit 122 drives associated output pin 101 to the predefined output state identified by SEL_MOD.

For some embodiments, the input circuits 121 of the IOBs are disabled and the output circuits 122 of the IOBs are driven to selected predefined states a predetermined time period (e.g., approximately 20 ns) after assertion of SUSPEND, although other time delays may be used. For other embodiments, the delay between assertion of SUSPEND and assertion of SPD_IN and SPD_OUT may be selected by the user and provided to suspend logic 170 as part of CD_SPD.

Referring again to FIG. 5A, after operation of the FPGA's resources have been suspended, the FPGA's static power consumption may be reduced using well-known power reduction techniques (step 505). For the exemplary embodiments of FIG. 3A, suspend logic 170 asserts PC (e.g., to logic high), which in turn causes voltage supply circuit 310 to reduce the voltage level of VCCO to a level that reduces static power consumption during suspend mode while maintaining data stored in various memory elements such as, for example, the configuration data stored in CM 160. For other embodiments that include a power management unit (not shown for simplicity) that can implement one or more user-selected power reduction techniques, suspend logic 170 provides select signals that instruct the power management unit as to which power reduction techniques to employ.

To terminate suspend mode, system control logic 220 de-asserts SUSPEND (e.g., to logic low) at time t4 (step 506). In response thereto, suspend logic 170 re-asserts AWAKE (e.g., to logic high) at time t6 to acknowledge receipt of the de-asserted SUSPEND signal (step 507). The asserted state of AWAKE may be used to inform system devices 210 that the FPGA is entering active mode, for example, to alert the system devices 210 of the pending synchronization between the FPGA and the system devices. For some embodiments, the time period between times t4 and t6 is determined by how long the FPGA's timing circuits (not shown for simplicity), such as a DLL (delay locked loop) circuit, take to lock, which for actual embodiments may be no more than 500 μs.

Suspend logic 170 then terminates suspend mode in the FPGA 100 (step 508), and thereafter sequentially re-activates the FPGA resources according to the user-programmed timing schedule (step 509). For example, referring to the exemplary flow chart of FIG. 5C, suspend logic 170 enables the input circuits 121 of the IOBs at time t5 (step 509a). For some embodiments, re-assertion of SUSPEND allows triggering edges of SCLK to increment the count value CNT1 of input circuit counter 351, and when CNT1 reaches the value of TRV1 stored in memory element 361, comparator 371 de-asserts SPD_IN to re-enable the input circuit 121 (see also FIG. 3B). In this manner, the time period between times t4 and t5 may be selected by the user by choosing an appropriate value for TRV1. For other embodiments, the time period between times t4 and t5 may be fixed, for example, by the FPGA manufacturer. For still other embodiments, suspend logic 170 may de-assert SPD_IN in response to assertion of AWAKE.

Note that for those embodiments in which assertion of SPD_CLK causes clock circuit 180 to lock SCLK to a known state, the de-assertion of SPD_CLK causes clock circuit 180 to unlock SCLK, which in turn may be synchronized with external clock signals using the asserted AWAKE signal output from the FPGA.

Next, suspend logic 170 unlocks the FPGA's CLBs 110 and Block RAM 190 at time t7 to allow subsequent logic state changes therein (step 509b). For some embodiments, re-assertion of AWAKE allows triggering edges of SCLK to increment the count value CNT2 of clock enable counter 352, and when CNT2 reaches the value of TRV2 stored in memory element 362, comparator 372 de-asserts SPD_CLK to allow subsequent triggering edges of SCLK to begin clocking the synchronous elements within CLBs 110 and block RAM 190. In this manner, the time period between times t6 and t7 may be selected by the user by choosing an appropriate value for TRV2. For other embodiments, the time period between times t6 and t7 may be fixed, for example, by the FPGA manufacturer. For still other embodiments, de-assertion of SUSPEND may be used to enable clock enable counter 352, and thus used to trigger de-assertion of SPD_CLK.

Next, suspend logic 170 releases the output pins 101 of the IOBs from their predefined output states at time t8 (step 509c). For some embodiments, re-assertion of AWAKE allows triggering edges of SCLK to increment the count value CNT3 of output circuit counter 353, and when CNT3 reaches the value of TRV3 stored in memory element 363, comparator 373 de-asserts SPD_OUT to re-enable the output circuits 122. In this manner, the time period between times t6 and t8 may be selected by the user by choosing an appropriate value for TRV3. For other embodiments, the time period between times t6 and t8 may be fixed, for example, by the FPGA manufacturer. For still other embodiments, de-assertion of SUSPEND may be used to enable output circuit counter 353, and thus used to trigger de-assertion of SPD_OUT.

As described above, the suspend pin 102(1) facilitates the FPGA's entry to and exit from the suspend mode during which the FPGA's resources are disabled and locked to known states, and various well-known power reduction techniques may be employed to reduce the FPGA's static power consumption. In this manner, upon termination of suspend mode, the FPGA may wake-up according to a programmable timing schedule suitable for re-synchronizing the FPGA resources with the other system devices 210. Because various systems may operate in different ways, embodiments of the present invention improve the likelihood of meeting a particular user's suspend and wake-up characteristics by allowing the user to select one of a plurality of output states for I/O pins 101 during suspend mode to control the impact that the FPGA may have upon other system devices while the FPGA is in suspend mode.

Further, by allowing the user to control the timing schedule by which the various FPGA resources are disabled or locked to known states upon initiation of suspend mode and to control the timing sequence for re-activating the various FPGA resources upon termination of suspend mode, embodiments of the present invention provide flexibility in minimizing glitches within the system that may be caused by transitioning the FPGA between suspend mode and active mode. In addition, embodiments of the present invention allow an external device to place the FPGA into suspend mode and return the FPGA to active mode according to user-defined criteria using a single I/O pin to receive the SUSPEND signal.

Although the present invention has been described in connection with several embodiments, it is understood that the present invention is not limited to the embodiments disclosed, but is capable of various modifications, which would be apparent to a person skilled in the art. Thus, the present invention is limited only by the following claims.

What is claimed is:

1. A method of implementing a suspend mode for an integrated circuit including configurable resources and a suspend pin for receiving a suspend signal, the method comprising:
    storing configuration data associated with a circuit for implementing the suspend mode, wherein the configuration data represents time periods for enabling circuits of the integrated circuit after the suspend mode;
    receiving the suspend signal;
    initiating the suspend mode in response to receiving the suspend signal;
    locking first configuration resources to known logic states during the suspend mode;
    driving output pins of second configuration resources to one of a plurality of predefined output states during the suspend mode;
    reducing the power consumption of the configurable resources during the suspend mode;
    maintaining a voltage level of a supply voltage coupled to power a configuration memory associated with the configurable resources at a sufficient voltage level to maintain the logic states of data stored in the configuration memory, wherein the data would be lost if the configuration memory were powered down;
    unlocking the first configurable resources in response to first configuration data of the configuration data associated with a circuit for implementing the suspend mode; and
    releasing the output pins of the second configuration resources in response to second configuration data of the configuration data associated with a circuit for implementing the suspend mode.

2. The method of claim 1, wherein initiating the suspend mode further comprises:
    reducing a supply voltage provided to one or more of the configurable resources.

3. The method of claim 1, wherein the driving comprises:
    maintaining a current logic state for an I/O pin if a mode select signal is in a first state; and
    tri-stating the I/O pin if the mode select signal is in a second state.

4. The method of claim 1, further comprising:
    providing mode select signals to the integrated circuit during configuration of the integrated circuit.

5. The method of claim 1, wherein the configurable resources comprise a plurality of configurable logic blocks, and wherein the suspending comprises:
    preventing subsequent logic state changes in the configurable logic blocks.

6. The method of claim 5, wherein the preventing comprises:
    disabling a clock signal employed to clock data through various synchronous elements within the configurable logic blocks.

7. The method of claim 1, further comprising: de-asserting the suspend signal; asserting an awake signal to acknowledge receipt of the de-asserted suspend signal; and terminating the suspend mode in response to the de-assertion of the suspend signal.

8. The method of claim 7, further comprising:
    sequentially re-activating the configurable resources according to a user-programmable timing schedule.

9. The method of claim 8, further comprising:
    providing the timing schedule to the integrated circuit during configuration of the integrated circuit.

10. The method of claim 8, wherein the configurable resources comprise a plurality of output circuits each coupled to a corresponding integrated circuit input/output (I/O) pin of the integrated circuit and comprise a plurality of configurable logic blocks, and wherein the sequentially re-activating comprises:
    re-activating the output circuits for normal operation a first selected time period after assertion of the awake signal; and
    allowing subsequent logic state changes in the configurable logic blocks a second selected time period after assertion of the awake signal.

11. An integrated circuit comprising:
    a plurality of configurable resources including a number of configurable blocks and a number output circuits, each output circuit coupled to a corresponding output pin of the integrated circuit;
    a suspend pin for receiving a suspend signal;
    a suspend circuit having an input to receive the suspend signal, a first output to provide a suspend clock signal to lock configurable resources of the configurable blocks to known logic states, and a plurality of second outputs each to provide a mode select signal to a corresponding output circuit to drive output pins of the output circuits to one of a plurality of predefined output states;
    a configuration memory storing configuration data associated with the suspend circuit and representing time periods for enabling circuits of the integrated circuit after a suspend mode, wherein the configurable resources of the configurable blocks are unlocked in response to first configuration data stored in the configuration memory and the output pins are released in response to second configuration data stored in the configuration memory; and
    a voltage supply circuit coupled to receive a power control signal, wherein the voltage supply circuit provides a supply voltage to the configuration memory, wherein the supply voltage is set at a sufficient level to maintain the logic states of data stored in the configuration memory, and wherein the data would be lost if the configuration memory were powered down.

12. The integrated circuit of claim 11, wherein the suspend circuit is configured to de-assert an awake signal and initiate the suspend mode in the integrated circuit in response to an assertion of the suspend signal.

13. The integrated circuit of claim 12, wherein upon assertion of the suspend signal, the suspend circuit de-activates the output circuits and drives each output circuit to one of the plurality of predefined output states selected by the corresponding mode select signal.

14. The integrated circuit of claim 13, wherein each output circuit maintains its associated output pin in its current logic state if the corresponding mode select signal is in a first state, and each output circuit tri-states its associated output pin if the corresponding mode select signal is in a second state.

15. The integrated circuit of claim 12, wherein upon assertion of the suspend signal, the suspend circuit is configured to assert the suspend clock signal to suspend operation of the configurable blocks.

16. The integrated circuit of claim 15, wherein the suspend circuit is further configured to assert the awake signal and terminate the suspend mode in response to a de-assertion of the suspend signal.

17. The integrated circuit of claim 16, wherein upon termination of the suspend mode, the suspend circuit is further configured to sequentially re-activate the output circuits and the configurable blocks according to a user-programmable timing schedule.

18. The integrated circuit of claim 17, wherein the configuration memory stores the user-programmable timing schedule and the mode select signals.

* * * * *